United States Patent
Rogers et al.

(10) Patent No.: US 10,078,882 B2
(45) Date of Patent: *Sep. 18, 2018

(54) PRIORITY-BASED COMMAND EXECUTION

(71) Applicant: Advanced Micro Devices, Inc., Sunnyvale, CA (US)

(72) Inventors: Philip J. Rogers, Austin, TX (US); David Gotwalt, Winter Springs, FL (US); Tom Frisinger, Shrewsbury, MA (US); Rex McCrary, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,395

(22) Filed: Nov. 8, 2016

(65) Prior Publication Data

US 2017/0053377 A1 Feb. 23, 2017

Related U.S. Application Data

(63) Continuation of application No. 13/171,979, filed on Jun. 29, 2011, now Pat. No. 9,519,943.

(60) Provisional application No. 61/420,393, filed on Dec. 7, 2010.

(51) Int. Cl.
  *G06T 1/20* (2006.01)
  *G06F 9/48* (2006.01)
  *G06F 9/50* (2006.01)

(52) U.S. Cl.
  CPC ............. *G06T 1/20* (2013.01); *G06F 9/4818* (2013.01); *G06F 9/4881* (2013.01); *G06F 9/5044* (2013.01); *G06F 2209/509* (2013.01); *G06F 2209/5021* (2013.01)

(58) Field of Classification Search
  CPC ....... G06T 1/20; G06F 9/4818; G06F 9/5044; G06F 9/4881; G06F 2209/509; G06F 2209/5021
  See application file for complete search history.

(56) References Cited

U.S. PATENT DOCUMENTS

| | | |
|---|---|---|
| 5,706,515 A | 1/1998 | Connelly et al. |
| 6,950,107 B1 | 9/2005 | Moreton et al. |
| 7,418,576 B1 | 8/2008 | Lindholm et al. |
| 7,865,485 B2 | 1/2011 | Mullick et al. |
| 8,228,529 B2 | 7/2012 | Yamada et al. |
| 9,519,943 B2 * | 12/2016 | Rogers ............... G06T 1/20 |
| 2004/0064578 A1 | 4/2004 | Boucher et al. |
| 2010/0287216 A1 | 11/2010 | Ylonen |
| 2011/0050713 A1 | 3/2011 | McCrary et al. |
| 2011/0055511 A1 | 3/2011 | Mantor et al. |
| 2011/0102443 A1 * | 5/2011 | Dror ................. G06T 1/20 345/522 |
| 2011/0153985 A1 | 6/2011 | Saha et al. |
| 2011/0157195 A1 * | 6/2011 | Sprangle ............. G06T 1/20 345/522 |
| 2011/0238792 A1 | 9/2011 | Phillips et al. |
| 2012/0069032 A1 | 3/2012 | Hansson et al. |

* cited by examiner

*Primary Examiner* — Maurice L McDowell, Jr.
(74) *Attorney, Agent, or Firm* — Volpe and Koenig, P.C.

(57) ABSTRACT

A method of processing commands is provided. The method includes holding commands in queues and executing the commands in an order based on their respective priority. Commands having the same priority are held in the same queue.

15 Claims, 7 Drawing Sheets

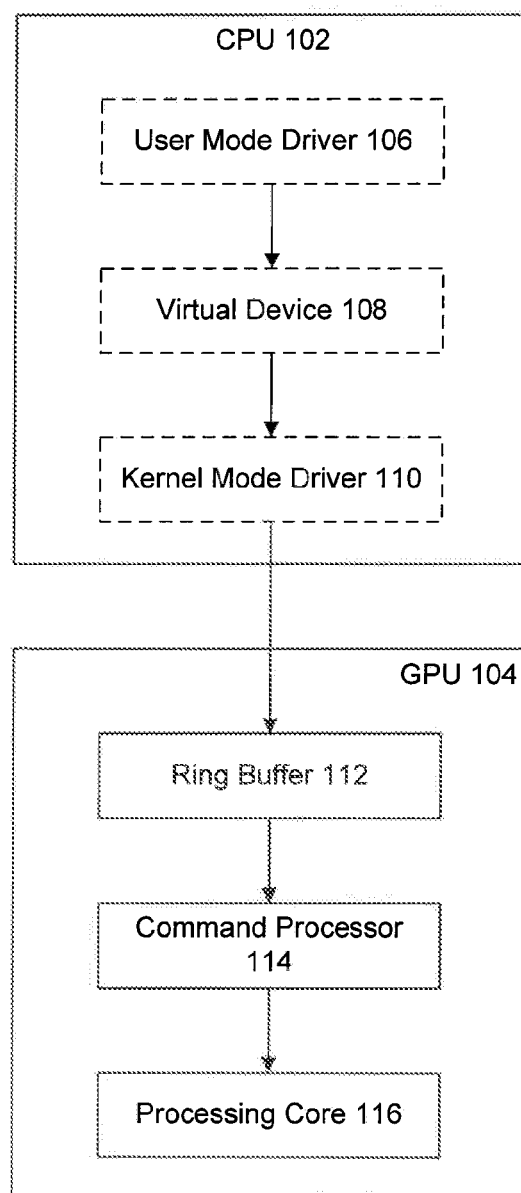
Conventional
FIG. 1

PRIORITY-BASED COMMAND EXECUTION

CROSS REFERENCE TO RELATED APPLICATIONS

This application is a continuation of U.S. patent application Ser. No. 13/171,979, filed Jun. 29, 2011, which claims the benefit of U.S. Provisional Application No. 61/420,393 filed Dec. 7, 2010, which are incorporated by reference as if fully set forth.

FIELD OF INVENTION

The present invention generally relates to processing of commands.

BACKGROUND

Existing processing systems often include multiple processing devices. For example, some systems include a central processing unit (CPU) and a graphics processing unit (GPU). A variety of different applications run on the CPU. Some of these applications can generate commands that the CPU sends to the GPU for execution. For example, applications running on the CPU can generate rendering commands. The rendering commands are sent to the GPU, which uses the results of the rendering commands to control a display.

Existing systems often do not allow for other types of commands to be sent to the GPU for execution. For example, computational commands, e.g., physics or artificial intelligence commands, often cannot be sent to the GPU for execution because the CPU needs results from these commands relatively quickly. Because the computational commands may have to wait behind other commands to be executed, the latency incurred by sending computational commands to the GPU may be too high.

Not sending the computational commands to the GPU for execution, however, means that the CPU must execute the commands. This adds to the processing burden of the CPU and can hamper the performance of the system. Thus, what is needed are methods and systems that allow for different types of commands to be executed in a desired order so that results from relatively high priority commands can be obtained within a desirable latency.

SUMMARY

Embodiments described herein generally relate to providing for priority-based execution of commands. For example, methods and systems described herein may allow high priority commands to be executed on a processing device (e.g., a graphics processing unit) before commands having relatively lower priority.

In one embodiment, a method of processing commands is provided. The method includes holding commands in a set of queues and executing the commands in an order based on their respective priority. Commands having the same priority are held in the same queue.

In another embodiment, a processing device is provided. The processing device includes a set of queues, each queue being configured to hold commands and a command processor configured to retrieve the commands from the set of queues. The set of queues include a high priority queue that holds high priority commands. The command processor is configured to retrieve high priority commands held in the high priority queue before retrieving commands held in other queues of the set of queues.

Further features and advantages of the invention, as well as the structure and operation of various embodiments of the invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 1 is an illustration of a conventional processing system, according to embodiments of the present invention.

The present invention will be described with reference to the accompanying drawings. Generally, the drawing in which an element first appears is typically indicated by the leftmost digit(s) in the corresponding reference number.

DETAILED DESCRIPTION OF THE PREFERRED EMBODIMENTS

Figure 2:
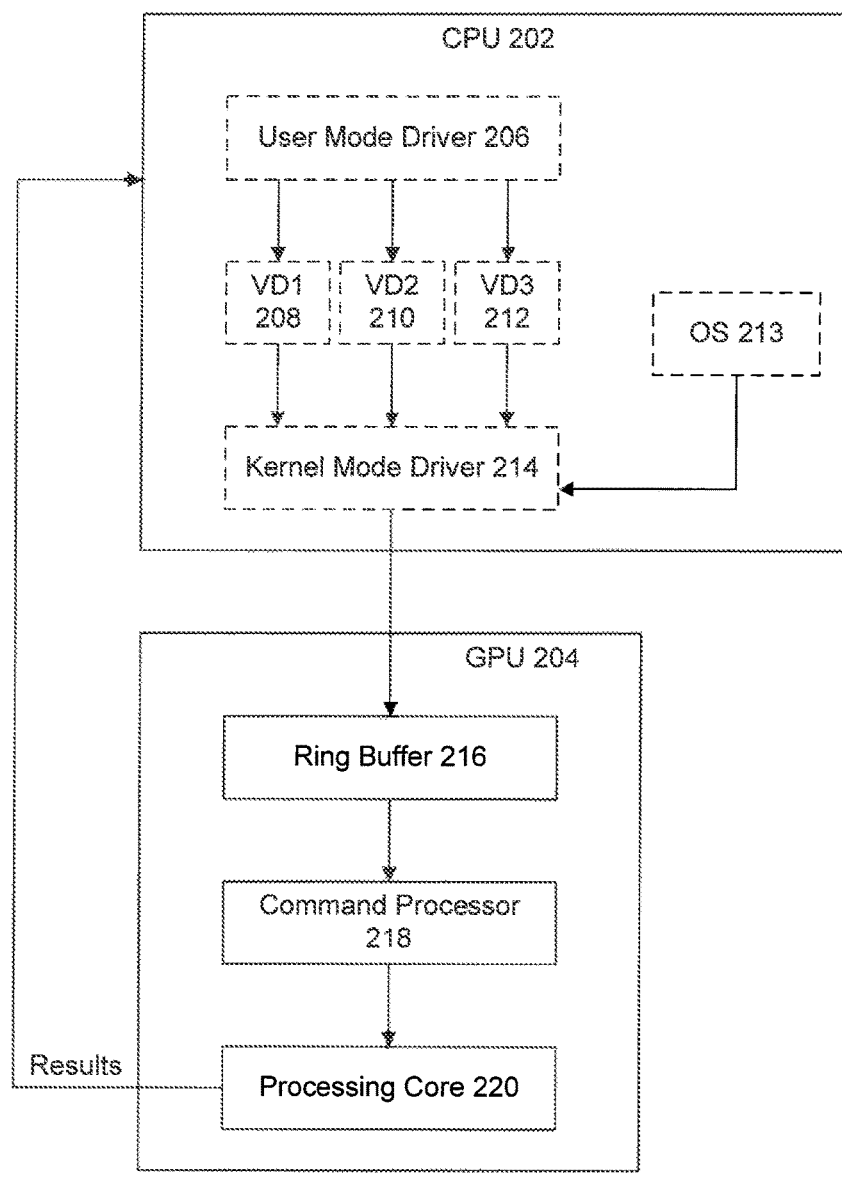
FIGS. 2 and 3 are illustrations of processing systems, according to embodiments of the present invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

FIG. 1 shows a block diagram of a conventional processing system 100. Processing system 100 includes a central processing unit (CPU) 102 and a graphics processing unit (GPU) 104. GPU 104 includes a ring buffer 112, a command processor 114, and a processing core 116.

CPU 102 has a variety of processes running on it. For example, CPU 102 has a user mode driver 106, a virtual device 108, and a kernel mode driver 110 running on it. In an embodiment, user mode driver 106 and virtual device 108 are parts of an application running on CPU 102. For example, user mode driver 106 and virtual device 108 can be parts of a gaming application running on CPU 102. Kernel mode driver 110 can be an aspect of an operating system currently being run on CPU 102.

The application running on CPU 102 can generate graphics commands. The commands can include rendering commands intended to generate an image or a frame for display. Rendering commands generated by an application running on CPU 102 are often sent to GPU 104 for execution. GPU 104 can then execute the rendering commands and use the results to control what is displayed on a screen. Having GPU 104 execute some graphics commands also can relieve some of the processing load of CPU 102.

When graphics commands are to be sent to GPU 104, the commands are first received by user mode driver 106. User mode driver 106 allows the application to interact with GPU 104. The application and user mode driver 106 create a virtual device 108 that abstracts GPU 104. Thus, user mode driver 106 can send graphics commands to virtual device 108 as if it was sending those commands directly to GPU 104. In operation, virtual device 108 includes a queue that holds the graphics commands. Kernel mode driver 110 retrieves commands from the virtual device and sends the commands to GPU 104.

Commands received from CPU 102 at GPU 104 are held in ring buffer 112. Command processor 114, then, retrieves the commands held in ring buffer 112 sends them to processing core 116. In an embodiment, command processor 114 is implemented as a microcontroller. Processing core 116 receives the commands from command processor 114 and executes the commands.

Processing system 100 has been described with respect to an embodiment in which individual commands generated by an application running on CPU 102 are sent and executed by GPU 104. In another embodiment, commands are grouped together in command buffers and these command buffers are sent to GPU 104 and executed, one by one, by processing core 116.

Thus, the processing system 100 allows for certain types graphics commands, e.g., rendering commands, generated by an application running on CPU 102 to be executed by GPU 104. Rendering commands are generated by the application running on CPU 102 two or three frames before they are to appear on the screen. Furthermore, results of these commands typically do not need to be sent to CPU 102. Rather, these results are used to control the display. Thus, for rendering commands, the latency incurred by having GPU 104 execute the commands does not hamper the performance of system 100.

However, certain other types of commands may not be able to be executed on GPU 104. For example, computational commands, e.g., physics and artificial intelligence commands, may not be able to be sent to GPU 104 for execution. In particular, aspects of the application running on CPU 102 may depend on results from computational commands. Because the computational commands may be executed by GPU 104 after rendering commands, the results of the computational commands may not be received by CPU 102 in the desired time frame.

For example, the results from computational commands can be used by the application to calculate data required for the next frame to be displayed. Because these computational commands will have to wait with other types of commands, e.g., rendering commands, GPU 104 may not be able to execute the commands and provide results back to CPU in time. For example, GPU 104 may not be able to provide results back to CPU 102 before the next frame is to be generated.

In embodiments described herein, methods and systems are provided for executing commands based on a priority associated with each of the commands. For example, computational commands can be assigned a higher priority than rendering commands. The computational commands, then, are executed before the rendering commands so that results can be provided from the GPU back to the CPU with an acceptable latency. Thus, the CPU can be relieved of at least some of the processing burden that comes from computational commands.

FIG. 2 shows a processing system 200, according to an embodiment of the present invention. Processing system 200 includes a CPU 202 and a GPU 204. CPU 202 has a user mode driver 206, virtual devices 208-212, an operating system (OS) 213, and a kernel mode driver 214 running on it. GPU 204 includes a ring buffer 216, a command processor 218, and a processing core 220. In an embodiment, ring buffer 216 and command processor 218 are substantially similar to ring buffer 112 and command processor 114 of GPU 104, described with reference to FIG. 1.

Instead of having a single virtual device like the application running on CPU 102, the application running on CPU 202 creates three virtual devices that take commands from user mode driver 206. In an embodiment, user mode driver 206 sends commands to a queue of virtual devices 208, 210, and 212 based on a priority associated with the command. For example, user mode driver 206 may interpret computational commands, i.e., physics or artificial intelligence commands, as having a high priority, rendering commands as having a mid priority, and background commands as having low priority. Background commands can be generated by applications that run when a personal computer has computational resources that would otherwise be idle.

OS 213 controls the operation of kernel mode driver 214, which retrieves commands from virtual devices 208-212. For example, OS 213 can control kernel mode driver 214 to switch from retrieving commands from a queue of one virtual device to a queue of another virtual device. In an embodiment, OS 213 can control kernel mode driver 214 can retrieve commands from queues of virtual devices 208-212 in a round-robin manner. Generally, if kernel mode driver 214 retrieves commands in a round-robin manner and if commands of a lower priority take longer to execute than the relatively higher priority commands or if the relatively lower priority commands outnumber the relatively higher priority commands, the relatively higher priority will have a lower latency in the queue of their virtual device. Thus, in the case that mid and low priority commands outnumber high priority commands, individual high priority commands will have lower latency in virtual device 208 than commands in virtual devices 210 and 212. For example, if rendering commands outnumber computational commands, the computational commands will have a lower latency in the queue of their respective virtual device than will rendering commands. Furthermore, if background commands outnumber rendering commands, the latency for rendering commands will be smaller than the latency for background commands. Thus, the use of different virtual devices for each priority of commands allows higher priority commands to wait a shorter amount of time before they are sent to GPU 204 for execution.

Commands received at GPU 204 are held in ring buffer 216. Command processor 218 retrieves commands from ring buffer 216 and sends them to processing core 220 for execution. As shown in FIG. 2, processing core 220 sends results back to CPU 202 (for commands that generate results to be used by CPU 202, e.g., computational commands).

By sending high priority commands to GPU 204 before mid and low priority commands, the time between when a high priority command is generated and the result is received at CPU 202 can be substantially reduced, e.g., compared to latencies for results in system 100.

FIG. 2 has been described with respect to the embodiment in which a single process is running on CPU 202. Thus, FIG. 2 shows a single instance of user mode driver 206 and a single set of virtual devices 208-212 running on CPU 202. On the other hand, in embodiments in which multiple processes are running on CPU 202, an instance of user mode driver 206 and a set of virtual devices 208-212 is provided for each process. Kernel mode driver 214, under the direction of OS 213, fetches commands from the queues of the different virtual devices. For example, kernel mode driver 214 can fetch commands from among all of the virtual devices in a round robin manner.

Figure 3:
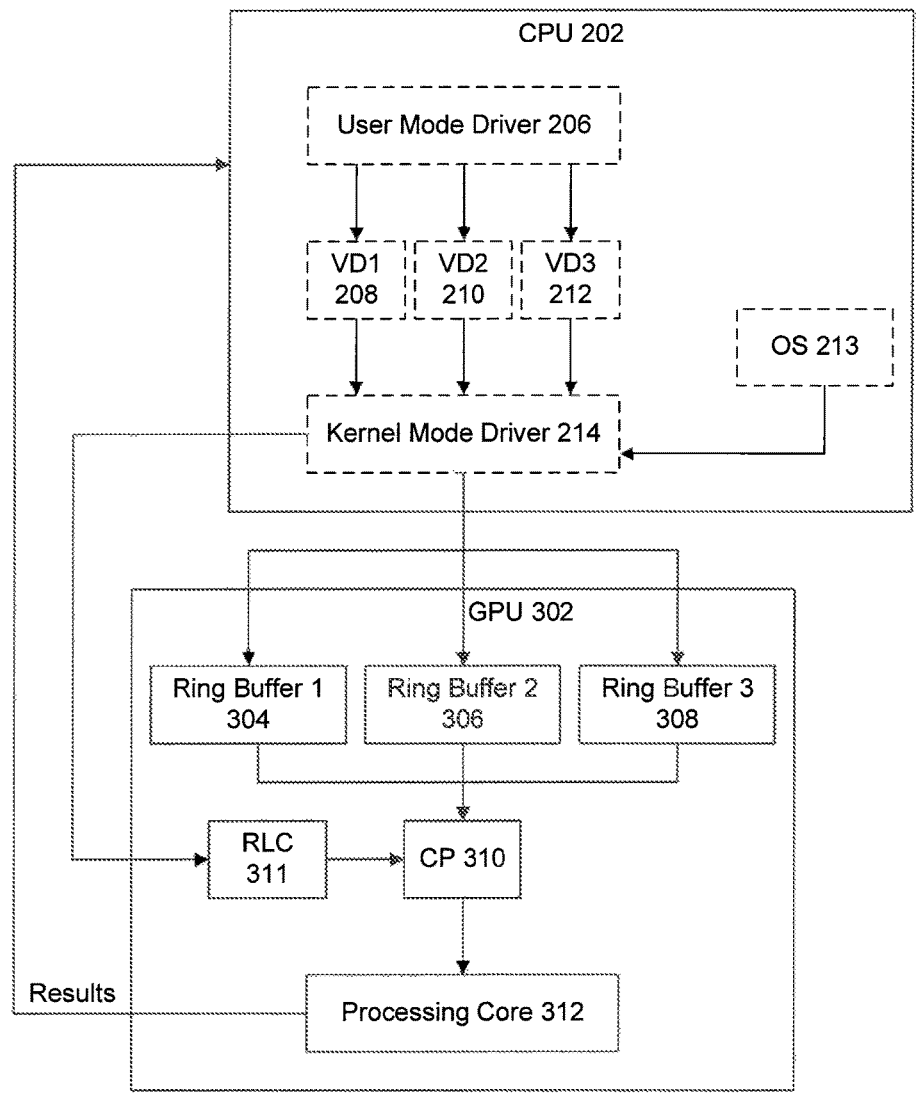

FIG. 3 shows a processing system 300, according to an embodiment of the present invention. Processing system 300 includes CPU 202 and a GPU 302. CPU 202 is similar to CPU 202 described with reference to FIG. 2. GPU 302 includes ring buffers 304-308, a command processor 310, a run list controller 311 (RLC), and a processing core 312.

Similar as described with reference to FIG. 2, kernel mode driver 214 retrieves commands from each of virtual devices 208, 210, and 212 (e.g., in a round-robin manner) and sends those commands to GPU 302. For example, high priority commands (e.g., computational commands), mid priority commands (e.g., rendering commands), and low priority commands (e.g., background commands) can be held in queues of virtual devices 208, 210, and 212, respectively. Unlike GPU 204, however, GPU 302 includes multiple ring buffers to receive commands from CPU 202. In an embodiment, GPU 302 includes a ring buffer for each priority type. For example, ring buffers 304, 306, and 308 can be used to hold commands retrieved from queues of virtual devices 208, 210, and 212, respectively. In the embodiment in which CPU 202 is running multiple processes each having its own respective instance of user mode driver 206 and respective set of virtual devices 208-212, ring buffer 304 can hold commands from queues of each virtual device 208, ring buffer 306 can hold commands from queues of each virtual device 210, and ring buffer 308 can hold commands from queues of each virtual device 212. For example, ring buffers 304, 306, and 308 can hold high, mid, and low priority commands, respectively.

Command processor 310 retrieves commands from ring buffers 304-308 and sends them to processing core 312 for execution. RLC 311, under the direction of kernel mode driver 214, controls command processor 310 to switch between ring buffers of ring buffers 304-308. In an embodiment, RLC 311 controls command processor 310 such that command processor 310 retrieves commands from ring buffers 304-308 in a round-robin manner. In alternate embodiments, RLC 311 controls command processor 310 to retrieve commands from ring buffers 304-308 according to other schemes. For example, command processor 310 can retrieve all commands from a higher priority buffer before moving on to retrieve commands from a lower priority buffer. For example, command processor 310 can retrieve all commands being held in ring buffer 304 before moving on to retrieve commands from ring buffer 306. Command processor 310, then, would retrieve all commands from ring buffer 306 before moving on to retrieve commands from ring buffer 308. Furthermore, command processor 310 can switch between buffers if commands are entered into a higher priority buffer. For example, while command processor 310 is retrieving commands from ring buffer 306, RLC 311 can determine that a command has been entered into ring buffer 304. Upon making that determination, RLC 311 can switch command processor 310 to ring buffer 304 and retrieve the command that was entered into ring buffer 304. Thus, unlike command processor 218 of GPU 204, command processor 310 and RLC 311 form a multithreaded system that can monitor the status of more than one ring buffer. In an embodiment, command processor 310 and RLC 311 can be implemented as different microcontrollers. In another embodiment, command processor 310 and RLC 311 can be implemented as a single microcontroller.

Command processor 310 can be further configured to preempt command buffers being executed on processing core 312. For example, if processing core 312 is executing commands included in a command buffer having a mid priority and command processor 310 can determine that a high priority command or command buffer has been entered into ring buffer 304, command processor 310 can preempt the command buffer being executed on processing core 312. Specifically, command processor 310 allows a command that is currently being executed to be completed, but prevents the execution of the next command in the command buffer from starting so that processor core 312 can execute the newly received high priority command (or command buffer). Once the high priority command(s) are executed and results have been sent to CPU 202, processing core 312 can return to the interrupted command buffer and finish executing the stopped command buffer.

Figure 7:
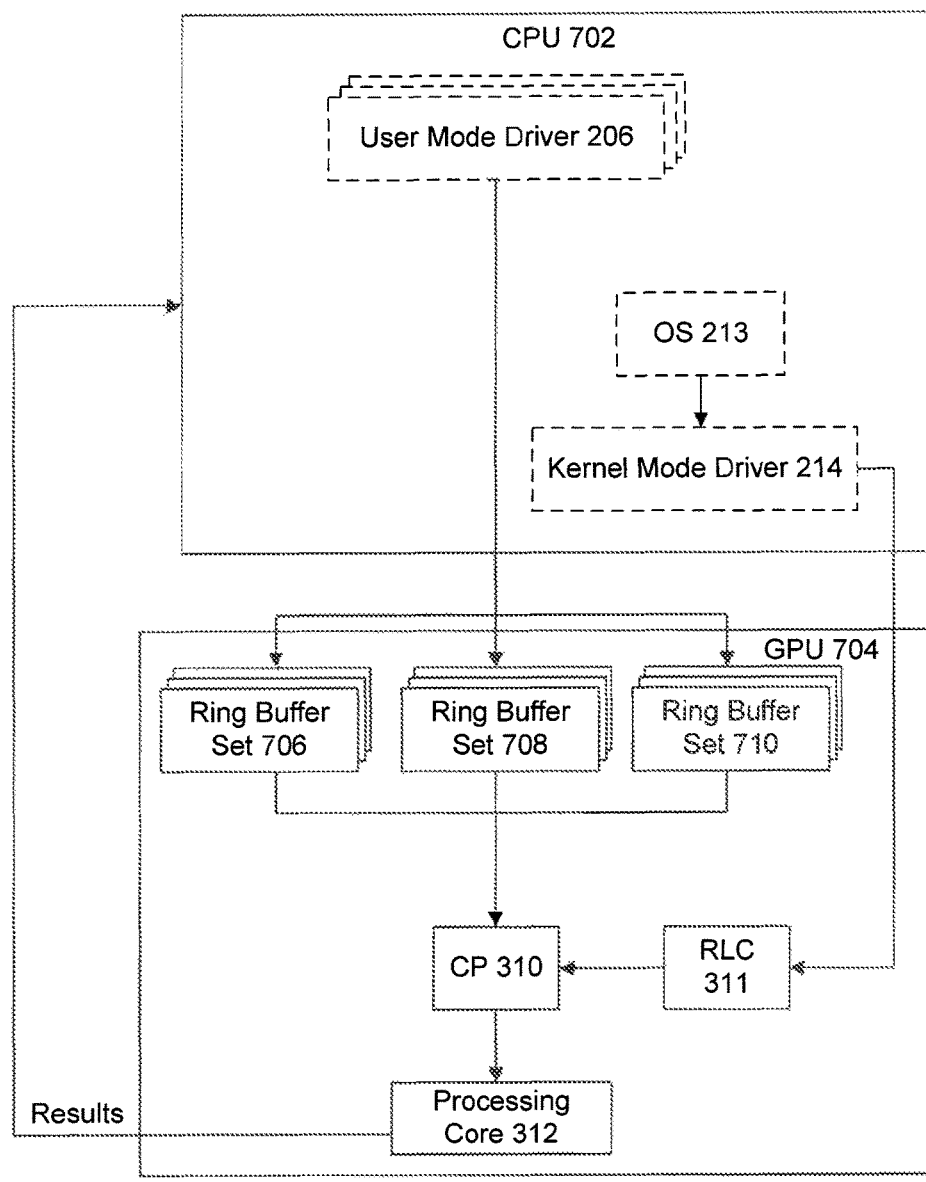
FIG. 7 is an illustration of a processing system, according to an embodiment of the present invention.

FIG. 7 shows a processing system 300, according to an embodiment of the present invention. Processing system 700 includes a CPU 702 and a GPU 704. CPU 702 is similar to CPU 202 described with reference to FIG. 2 except that virtual devices 208-212 are not running on CPU 702. GPU 704 is similar to GPU 302 described with reference to FIG. 3.

As described above, CPU 202 can run multiple processes that drive graphics, each having its own instance of user mode driver 206. In the embodiment of FIG. 7, each instance of user mode driver 206 is associated with its own user mode ring buffer. Specifically, as shown in FIG. 7, GPU 704 includes ring buffer set 706, ring buffer set 708, and ring buffer set 710. Each of ring buffer sets 706-710 includes three user mode ring buffers corresponding to a respective one of the three instances of user mode driver 206.

In fetching commands from ring buffer sets 706-710, command processor 310 (under the direction of RLC 311) not only switches between ring buffer sets 706-710, but also switches between different user mode ring buffers included in each set. In one embodiment, command processor 310 can fetch commands from one user mode instance of each of ring buffer sets 706-710 sequentially. Alternatively, command processor 310 can fetch commands from each user mode ring buffer of a set before retrieving commands from another set of ring buffers.

Moreover, unlike the embodiments shown in FIGS. 2 and 3, in processing system 700, user mode driver 206 does not send commands to virtual devices. Rather, user mode driver 206 sends commands directly to ring buffers 304-308. Doing so may result in increased efficiency because fewer steps may be required to execute a command.

Processing systems 200, 300, and 700 can be implemented in a variety of ways. For example, processing systems 200, 300, and 700 can be implemented in a discrete system in which the respective CPU and GPU are implemented on separate dies and coupled together, e.g., through the use of a printed circuit board. In another embodiment, the respective CPU and GPU of processing systems 200, 300, and 700 can be implemented on the same die.

Figure 4:
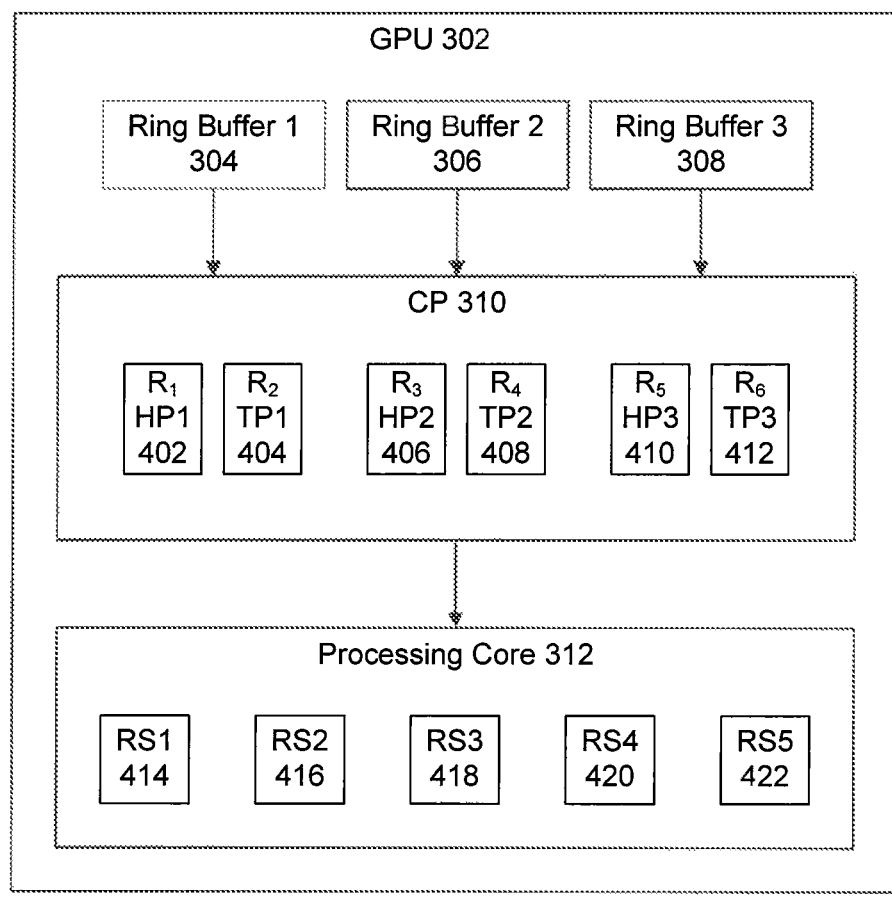
FIG. 4 is an illustration of a graphics processing unit, according to an embodiment of the present invention.

FIG. 4 shows a block diagram of GPU 302, according to an embodiment of the present invention. GPU 302 includes ring buffers 304-308, command processor 310, and processing core 312. Command processor 310 includes registers 402-412 and processing core 312 includes resources 414-422.

Figure 6:
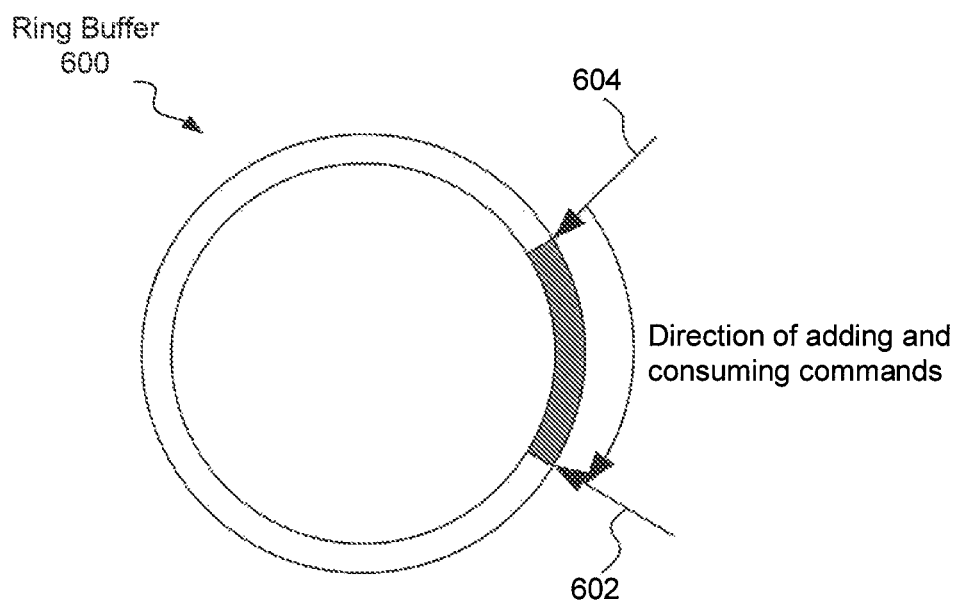
FIG. 6 shows a diagram of a ring buffer, according to an embodiment of the present invention.

FIG. 6 shows a diagram of a ring buffer 600, according to an embodiment of the present invention. Ring buffer 600 has a head pointer 602 and a tail pointer 604 associated with it. Tail pointer 604 points to the start of valid data. Head pointer 602 points to the end of valid data. When ring buffer 600 is used to hold commands, tail pointer 604 points to the start of valid commands and head pointer 602 points to the end of valid commands. As commands are placed in ring buffer 600, a kernel mode driver (e.g., kernel mode driver 214 shown in FIGS. 2 and 3) advances head pointer 602. As commands are retrieved from ring buffer 600, a command processor (e.g., command processor 310 shown in FIGS. 3 and 4) advances tail pointer 604. Once tail pointer 604 and head pointer 602 point to the same address in memory, command processor 310 determines that the ring buffer is empty.

In the example of FIG. 4, registers 402-412 are used to track the states of ring buffers 304-308. To maintain the state of each of ring buffers 304-308, command processor 310 has a pair of registers dedicated to each ring buffer. Specifically, registers 402 and 404 hold head and tail pointers, respectively, for ring buffer 304, registers 406 and 408 hold head and tail pointers, respectively, for ring buffer 306, and registers 410 and 412 hold head and tail pointers, respectively, for ring buffer 308. Compared to command processor 218 of GPU 204, command processor 310 is made to accommodate multiple ring buffers by including additional registers for head and tail pointers. For example, command processor 218 may only have two registers to hold head and tail pointers because GPU 204 only includes a single ring buffer 216 to hold commands received from CPU 202. By including additional registers to hold head and tail pointers, command processor 310 can maintain the state of each of ring buffers 304-308.

In an alternate embodiment, the head pointer and/or the tail pointer can be held in memory rather than registers. In such an embodiment, the command processor can poll the head pointer memory location and so discover updated values. Alternatively, the system can have a different mechanism to notify the command processor when an update occurs to the head pointer memory location. In that embodiment, the command processor can write new values to the tail pointer location in memory instead of to the tail pointer register.

As shown in FIG. 4, processing core 312 includes processing resources 414-422. In an embodiment, one or more of resources 414-422 is a processor. In an embodiment, the number of resources used to execute a command buffer may change during the execution of a command buffer. For example, towards the end of a rendering command buffer, one or more resources of resources 414-422 may become available. Command processor 310 can be configured to monitor the state of resources 414-422 and to determine that one or more resources of processing core 312 have become available. Command processor 310 can then determine whether a sufficient number of processing resources have become available so that another command or command buffer can start execution. For example, command processor 310 can be configured to determine whether a high priority command or command buffer can begin to be executed on processing core 312. In such a manner, the high priority command or command buffer would not have to wait until the command buffer currently running on processing core 312 was finished. Instead, once sufficient of processing resources have become available, those resources can be used to begin execution of another command or command buffer.

Figure 5:
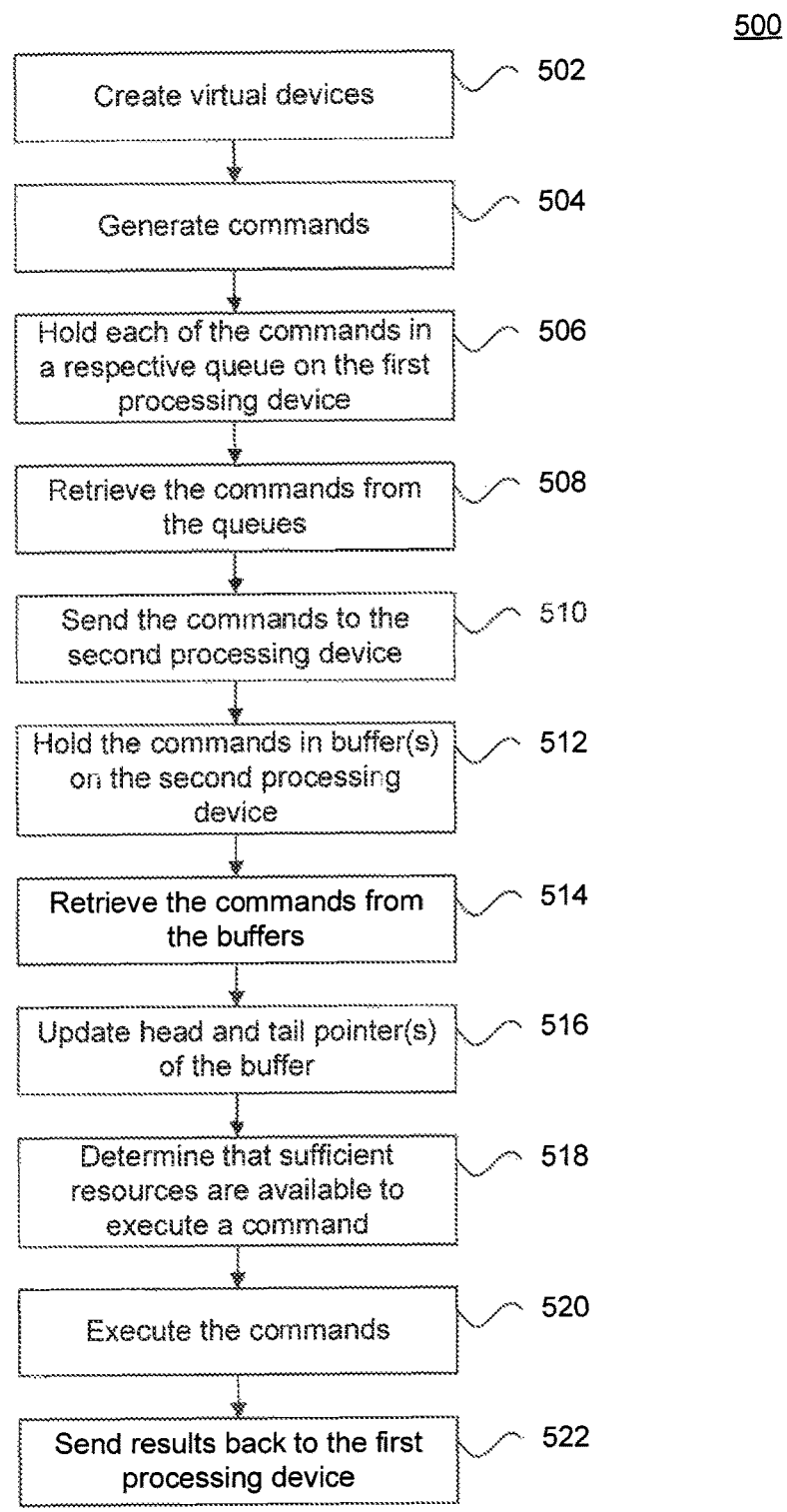
FIG. 5 is a flowchart of an exemplary method of processing commands, according to an embodiment of the present invention.

FIG. 5 is a flowchart of an exemplary method 500 of processing a memory request, according to an embodiment of the present invention. Other structural and operational embodiments will be apparent to persons skilled in the relevant art(s) based on the following discussion. Flowchart 500 is described with reference to the embodiments of FIGS. 24 and 7. However, flowchart 500 is not limited to those embodiments. The steps shown in FIG. 5 do not necessarily have to occur in the order shown. The steps of FIG. 5 are described in detail below, In step 502, virtual devices are created. For example, CPU 202 shown in FIGS. 2 and 3 can have an application running on it that creates virtual devices 208-212.

In step 504, commands are generated. For example, in FIGS. 2 and 3, the application running on CPU 202 can generate a variety of commands. For example, the application can generate commands that are deemed to have high priority, e.g., computational commands, commands deemed to have mid priority, e.g., rendering commands, and commands deemed to have low priority, e.g., background commands.

In step 506, each of the generated commands is held in a respective queue on the first processing device. For example, in FIGS. 2 and 3, user mode driver 206 of CPU 202 can place the generated commands in queues of virtual devices 208, 210 and 212. For example, user mode driver 206 can place high priority commands in virtual device 208, mid priority commands in virtual device 210, and low priority commands in virtual device 212.

In step 508, the commands are retrieved from the queues. For example, in FIGS. 2 and 3, kernel mode driver 214 can retrieve commands from virtual devices 208-212. In an embodiment, kernel mode driver 214 retrieves commands from virtual devices 208-212 in a round-robin manner. In alternate embodiments, kernel mode driver 214 can be configured to retrieve commands according to other schemes known to those skilled in the relevant arts.

In step 510, the commands are sent to the second processing device. For example, in FIG. 2 or 3, kernel mode driver 214 retrieves commands from virtual devices 208-212 and sends the commands to GPU 204 or GPU 302, respectively. In the example of FIG. 7, user mode driver 206 sends commands directly to GPU 702.

In step 512, the commands are held in buffer(s) on the second processing device. For example, in FIG. 2, commands received at GPU 204 are held in ring buffer 216. In another example, in FIG. 3, commands received at GPU 302 are held in ring buffers 304-308. In a further embodiment, commands are held in one of ring buffers 304, 306, and 308 depending on which virtual device of virtual devices 208, 210, and 212 they were held in at CPU 202. For example, commands held in virtual devices 208, 210, and 212 can be held in ring buffers 304, 306, and 308 respectively.

In step 514, commands are retrieved from the buffer(s). For example, in FIG. 2, command processor 218 retrieves commands held in ring buffer 216. The retrieved commands are sent to processing core 320 for execution. In the example of FIG. 3, command processor 310 retrieves commands from ring buffers 304-308. In an embodiment, command processor 310 can retrieve commands from ring buffers 304-308 in a round-robin manner. In an alternate embodiment, command processor 310 can empty higher priority buffers before moving on to lower priority buffers.

In step 516, head and tail pointers of the buffer are updated. For example, in FIG. 2, kernel mode driver 214 can update the head pointer of ring buffer 216 to reflect that commands have added to ring buffer 216. Command processor 218 can update the tail pointer of ring buffer 216 to reflect that commands have been retrieved from ring buffer 216. In the example of FIG. 4, kernel mode driver 214 and command processor 310 can update registers 402-412 to reflect that commands have been added to and retrieved from one or more of ring buffers 304-308.

In step 518, it is determined that sufficient resources are available to execute a command. For example, in FIG. 4, command processor 310 can determine that one or more sufficient resources of resources 414-422 are available to execute a command. For example, command processor 310 can determine that sufficient resources have become available so that a high priority command or command buffer can begin execution.

In step 520, the commands are executed. For example, in FIG. 2, command processor 218 sends the commands to processing core 220 for execution. In the example of FIG. 3, command processor 310 sends commands retrieved from ring buffers 304-308 to processing core 312 for execution. The commands can be executed one-by-one or as a part of one or more command buffers.

In step 522, results are sent back from the second device to the first device. For example, in FIG. 2, results from computational commands can be sent from GPU 204 back to CPU 202. In the example of FIG. 3, results from computational commands can be sent from GPU 302 to CPU 202.

In the description above, queues included in virtual devices (e.g., queues in virtual devices 108 and 208-212) and ring buffers (e.g., ring buffers, 112, 216, and 304-308) have been described separately. However, as described herein, the term "queue" encompasses both types of elements. Thus, in an embodiment, the term "queue" may refer to queues of virtual devices 108 and 208-212 and ring buffers, 112, 216, and 304-308, as well as other similar elements.

Embodiments of the present invention may be used in any computing device where register resources are to be managed among a plurality of concurrently executing processes. For example and without limitation, embodiments may include computers, game platforms, entertainment platforms, personal digital assistants, mobile phones, and video platforms. Embodiments of the present invention may be encoded in many programming languages including hardware description languages (HDL), assembly language, and C language. For example, an HDL, e.g., Verilog, can be used to synthesize, simulate, and manufacture a device that implements the aspects of one or more embodiments of the present invention. For example, Verilog can be used to model, design, verify, and/or implement the elements of system 200, system 300, and/or GPU 302, described with reference to FIGS. 2, 3, and 4, respectively.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for use in a system for processing commands, the method comprising:
   creating one or more virtual devices in a central processing unit (CPU), wherein each of the virtual devices is associated with a respective priority;
   generating one or more commands and storing each of the generated commands in a queue associated with one of the one or more virtual devices; and
   sending, based on a priority associated with each of the commands, the one or more commands from the queues of the one or more virtual devices to a graphics processing unit (GPU) for execution.

2. The method of claim 1, wherein the one or more commands that are sent from the queues of the one or more virtual devices are sent in a round-robin manner.

3. The method of claim 1, wherein the one or more commands from the queue of the one or more virtual devices are sent to one or more buffers in the GPU.

4. The method of claim 1, further comprising determining, at the GPU, processing resources needed to execute each command and executing each command, at the GPU, using processing resources.

5. The method of claim 1, further comprising sending a result of the each executed command from the GPU to the CPU.

6. A system for processing commands, comprising:
   a central processing unit (CPU) configured to create one or more virtual devices, store one or more generated commands in a queue associated with one of the one or more virtual devices; and
   a graphics processing unit (GPU) configured to receive, based on a priority associated with each of the commands, the one or more commands from the queues of the one or more virtual devices in the CPU and execute the received commands.

7. The system of claim 6, wherein the one or more commands that are sent from the queues of the one or more virtual devices are sent in a round-robin manner.

8. The system of claim 6, wherein the one or more commands from the queue of the one or more virtual devices are sent to one or more buffers in the GPU.

9. The system of claim 6, wherein the GPU is further configured to determine processing resources needed to execute each command and execute each command using processing resources.

10. The system of claim 6, wherein the GPU is further configured to send a result of each executed command from to the CPU.

11. A non-transitory computer-readable medium storing instructions that, when executed by a processor, cause the processor to perform a method for processing commands, the method comprising
    creating one or more virtual devices in a central processing unit (CPU), wherein each of the virtual devices is associated with a respective priority;
    generating one or more commands and storing each of the generated commands in a queue associated with one of the one or more virtual devices; and
    sending, based on a priority associated with each of the commands, the one or more commands from the queues of the one or more virtual devices to a graphics processing unit (GPU) for execution.

12. The non-transitory computer-readable medium of claim 11, wherein the one or more commands that are sent from the queues of the one or more virtual devices are sent in a round-robin manner.

13. The non-transitory computer-readable medium of claim 11, wherein the one or more commands from the queue of the one or more virtual devices are sent to one or more buffers in the GPU.

14. The non-transitory computer-readable medium of claim 11, further comprising determining, at the GPU, processing resources needed to execute each command and executing each command, at the GPU, using processing resources.

15. The non-transitory computer-readable medium of claim 11, further comprising sending a result of the each executed command from the GPU to the CPU.

* * * * *